United States Patent [19]

Hsu

[11] 4,452,562
[45] Jun. 5, 1984

[54] TORNADO TYPE WIND TURBINES

[75] Inventor: Cheng-Ting Hsu, Ames, Iowa

[73] Assignee: Iowa State University Research Foundation, Inc., Ames, Iowa

[21] Appl. No.: 492,464

[22] Filed: May 6, 1983

[51] Int. Cl.³ .............................................. F03D 3/04
[52] U.S. Cl. ............................. 415/2 A; 415/DIG. 1; 415/DIG. 8
[58] Field of Search .............................. 415/2 R-4 R, 415/2 A-4 A, DIG. 8, DIG. 1

[56] References Cited

U.S. PATENT DOCUMENTS

| 1,519,447 | 12/1924 | Fortier-Beaulieu | 415/3 R |
| 1,545,633 | 7/1925 | Bender | 415/2 |
| 1,612,838 | 1/1927 | Schultz | 417/194 |
| 3,296,450 | 1/1967 | Johnson | 415/121 |
| 4,018,543 | 4/1977 | Carson et al. | 415/2 |
| 4,070,131 | 1/1978 | Yen | 415/3 A |
| 4,309,146 | 1/1982 | Hein et al. | 415/2 R |

FOREIGN PATENT DOCUMENTS

| 539099 | 6/1922 | France | 415/DIG. 8 |
| 1062631 | 4/1954 | France | 415/DIG. 8 |
| 1086320 | 2/1955 | France | 415/2 A |
| 2081390 | 2/1982 | United Kingdom | 415/2 R |

*Primary Examiner*—Everette A. Powell, Jr.
*Attorney, Agent, or Firm*—Zarley, McKee, Thomte, Voorhees & Sease

[57] ABSTRACT

A tornado type wind turbine has a vertically disposed wind collecting tower with spaced apart inner and outer walls and a central bore. The upper end of the tower is open while the lower end of the structure is in communication with a wind intake chamber. An opening in the wind chamber is positioned over a turbine which is in driving communication with an electrical generator. An opening between the inner and outer walls at the lower end of the tower permits radially flowing air to enter the space between the inner and outer walls while a vertically disposed opening in the wind collecting tower permits tangentially flowing air to enter the central bore. A porous portion of the inner wall permits the radially flowing air to interact with the tangentially flowing air so as to create an intensified vortex flow which exits out of the top opening of the tower so as to create a low pressure core and thus draw air through the opening of the wind intake chamber so as to drive the turbine.

9 Claims, 4 Drawing Figures

TORNADO TYPE WIND TURBINES

GRANT REFERENCE

The work relating to this invention was supported by the Solar Energy Research Institute of the Department of Energy under the grant No. DE-FG02-80CS 89002.

BACKGROUND OF THE INVENTION

The wind has long been recognized as a source of energy and continues to be a viable solution to increasing energy demands. However, windmills aand the like are generally limited in scale and therefore are severely restricted in the production of energy and the locale of use. The wind also highly fluctuates in speed and in direction, and has a low energy density. This limited energy production of windmills makes it desirable to provide a more efficient means of harnessing the potential wind energy.

Tornado type wind energy systems have been designed so as to increase the power efficiency. These systems utilize tangential air flowing into a collecting tower to create a low pressure vortex flow which draws air through a turbine connected to an electrical generator. Tangentially guiding the wind into a circular cylindrical tower is not sufficient to produce a strong vortex flow. This tangentially flowing air merely produces a weak solid rotational type vortex in which the maximum tangential velocity equals the wind inlet speed. Thus, maximum power efficiencies of only 0.4 may be achieved. The power generated from these systems is directly related to the pressure of the vortex flow within the collecting tower. A spiral shaped tower can be used to produce radial inflow that will intensify the vortex flow so as to produce a power efficiency of approximately 2.5. A spiral tower however is not able to collect wind omnidirectionally. Further increases in the intensity of vortex flow will further increase the power efficiency and thus make wind a more attractive source of energy.

It is therefore a primary objective of the present invention to provide a device that utilizes radially flowing air in a collecting tower so as to reduce vortex flow pressure for greater power efficiency.

A further objective of the present invention is to provide a device for harnessing wind energy.

A further objective of the present invention is the provision of a device that will function in varying speeds of wind and will withstand winds with high velocity.

A further objective of the present invention is the provision of a device that will produce large amounts of electrical energy from wind.

A further object of the present invention is the provision of a device that is economical to manufacture and efficient in use.

SUMMARY OF THE INVENTION

The tornado type wind turbine of the present invention comprises an upright wind collecting tower having spaced apart inner and outer walls, and a central bore extending through the length of the tower. A portion of the inner wall is porous to allow air to pass therethrough. The lower end of the tower is in communication with a wind intake chamber. The wind intake chamber has a centrally disposed opening positioned over a turbine which is in turn in communication with an electrical generator. A plurality of openings in the roof of the wind intake chamber allows air from the wind chamber to enter the space between the inner and outer walls of the tower. A vertically disposed opening in the wind collecting tower permits tangentially flowing air to enter the central bore of the cylindrical structure. The air flowing in the space between the walls permeates the porous inner wall and flows radially into the tower to interact with the tangentially flowing air in the central bore of the cylindrical tower so as to create an intensified vortex flow. The vortex flow exits the cylindrical structure through the upper open end thus creating a low pressure core which draws air through the central opening in the wind chamber to drive the turbine and thus produce electrical energy.

DETAILED DESCRIPTION OF THE DRAWINGS

Figure 1:
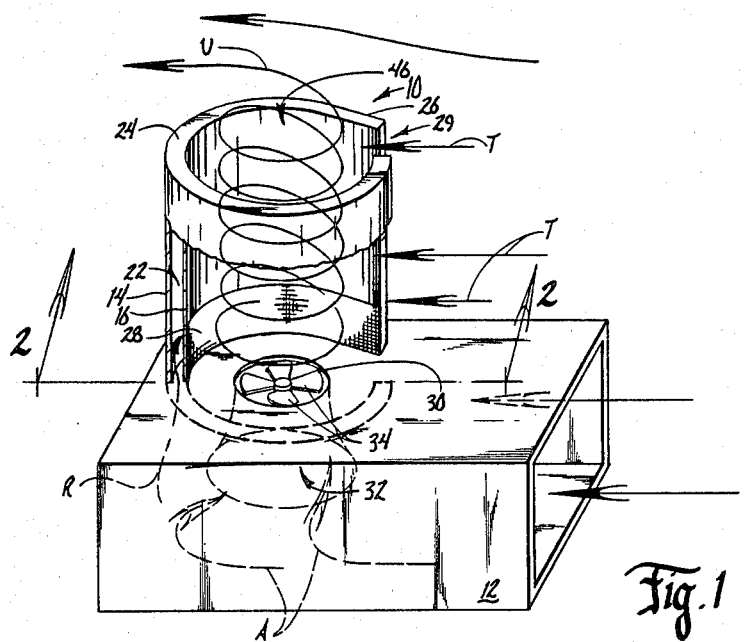
FIG. 1 is a perspective view of the tornado type wind turbine.
Figure 2:
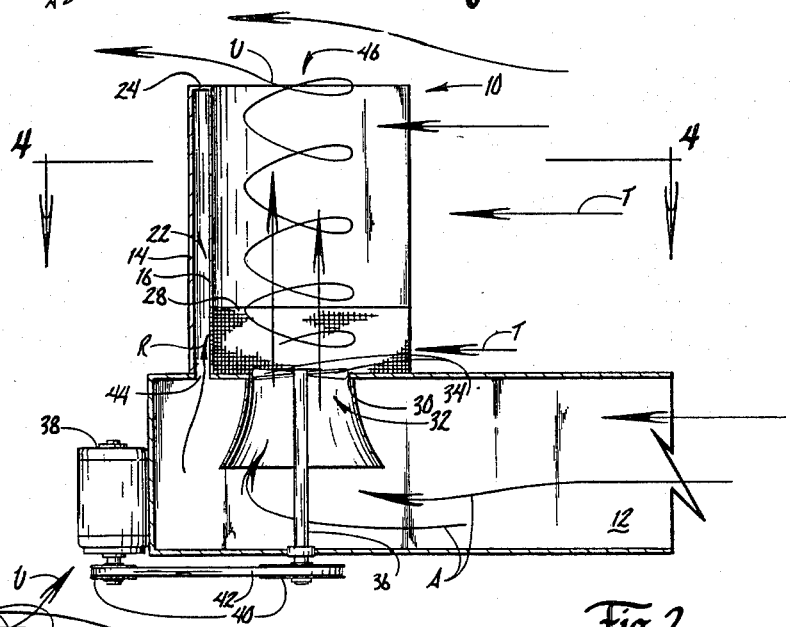
FIG. 2 is a sectional side elevation view of the wind turbine taken along line 2—2 of FIG. 1.

Referring to FIG. 1, the numeral 10 generally designates the upright wind collecting tower and the numeral 12 represents a wind intake chamber. Tower 10 has spaced apart outer wall 14 and inner wall 16 which terminate in end plates 18 and 20 which cover the space 22 between the two walls. The top of tower 10 has a plate 24 that covers the space 22 between outer wall 14 and inner plate 16 while that space is open at the bottom of the tower. Tower 10 is generally circular in cross section but has a straight portion 26 adjacent end plate 18. Inner wall 16 is constructed of porous material such as mesh screen 28 at its lower end. The opening between end plates 18 and 20 is generally designated by the numeral 29.

The wind chamber 12 has a hole 30 positioned over a turbine, generally designated by the numeral 32 that is mounted in the wind chamber. Turbine 32 has blades 34 aligned with hole 30 and a vertically disposed shaft 36 that is drivingly connected to an electric generator 38 by fly wheels 40 and belt 42.

The maximum tangential velocity within tower 10 is near the vortex axis. To achieve a strong vortex necessary for high maximum power efficiencies, a strong inflow of radially flowing air is required. Accordingly, a plurality of openings 44 are provided in wind chamber 12 to allow air, indicated by arrow R, to pass upwardly from wind chamber 12 into space 22 between outer wall 14 and inner wall 16. The air circulates between the inner and outer walls before passing radially through the mesh screen 28 at the lower end of inner wall 16 into central bore 46. Thus, the dynamic pressure of the wind circulating between walls 14 and 16 produces the radially flowing air necessary for a strong vortex flow to produce a greater maximum power efficiency.

Opening 29 between end plates 18 and 20 of wind collecting tower 10 permits tangentially flowing air indicated by arrow T, to enter the central bore 46 of wind collecting tower 10. The radially flowing air permeates the mesh screen 28 of inner wall 16 and interacts with the tangentially flowing air to create an intensified vortex flow represented by spiralling arrow V. The vortex flow exits tower 10 through open central bore 46 and thus creates a low pressure core within the central bore 46 that draws ambient air upward from the wind chamber 12, as shown by arrows A, through central opening 30 so as to drive the turbine 32. It is noted that the radially and tangentially flowing air captured by the tower 10 does not pass through the turbine blades 34. Generator 38 is in turn driven by turbine 32 to produce electrical energy from the kinetic energy and pressure energy of the wind. A maximum power efficiency of about 3.8 may be achieved which is almost ten times greater than that of conventional wind turbines.

The maximum power efficiency of the tornado-type wind turbine depends on the strength of the vortex flow created in tower 10. The power efficiency is proportional to the cube of the tower diameter to the vortex core diameter ratio.

The power efficiency of a wind turbine is equal to the ratio of the power extracted by the turbine to the rate at which the turbine can capture the kinetic energy of the wind. The power efficiency of a turbine for a steady, one dimensional, adiabatic, incompressible air flow is $$C_p = \frac{W}{V_1}\left[\frac{P_1 - P_2}{\frac{1}{2}\rho V_1^2} + 1 - \left(\frac{W}{V_1}\right)^2\right]$$

where
$C_p$ = power efficiency
$P_1$ = ambient static pressure before entering the turbine
$P_2$ = static pressure behind the turbine
$\rho$ = air density
$W$ = axial velocity of air at the turbine
$V_1$ = ambient wind speed.

To achieve a high power efficiency, it is desirable to have a high static pressure drop across the turbine blades as well as an optimal turbine mass flow rate, $W/V$. The achieved static pressure drop may be as much as ten times the dynamic pressure of the wind. This is a much greater pressure drop than achieved in conventional wind turbines. The optimal turbine intake velocity, W, is also greater than the free stream wind velocity, V, which also is not possible with standard windmills.

Figure 3:
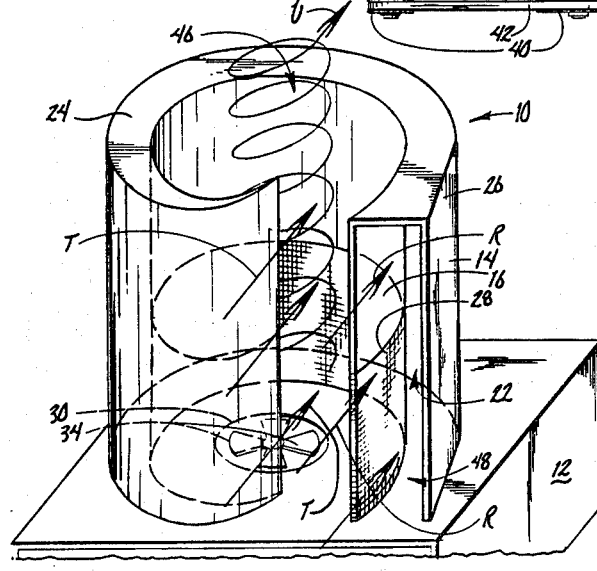
FIG. 3 is a perspective view of an alternative form of the cylindrical structure.
Figure 4:
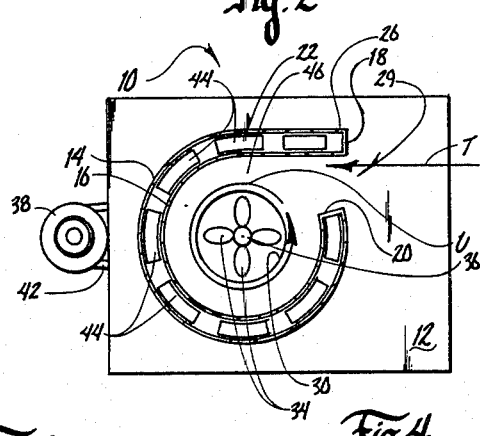
FIG. 4 is a top plan view taken along line 4—4 of FIG. 2.

It is understood that tower 10 may have a non-cylindrical cross section, such as the spiraling cross section shown in FIG. 3, without departing from the present invention. One spiral turn yields the best results. Such a spiralling cross section will produce a maximum power efficiency of about 9.0.

As an alternative to the openings 44 in wind chamber 12, end member 18 may be eliminated, thus leaving a slot 48 for air to pass through into the space 22 between outer wall 14 and inner wall 16 so as to create the radially flowing air necessary to intensify the vortex flow, as shown in FIG. 3. This means of introducing the radially flowing air may be used on either the circular or spiral tower.

It can thus be seen that the present invention accomplishes at least all of its stated objectives.

What is claimed is:

1. A tornado type wind turbine comprising:
   a wind collecting tower with vertically disposed longitudinal axis having spaced apart inner and outer walls and a central bore,
   a means for providing radially flowing air to said central bore,
   a means for providing tangentially flowing air to said central bore,
   said wind collecting tower having a lower end in communication with a wind intake chamber and an open upper end,
   a portion of said inner wall being porous, and
   said radially flowing air and said tangentially flowing air interacting within said central bore of said wind collecting tower so as to create an intensified vortex flow.

2. The wind turbine of claim 1 wherein said wind tower has a first large opening positioned above a turbine and a plurality of smaller openings providing said communication between said lower end of said tower and said wind intake chamber.

3. The wind turbine of claim 2 wherein said turbine is in driving communication with an electrical generator.

4. The wind turbine of claim 3 wherein said means for providing tangentially flowing air to said central bore is a vertically disposed opening in said tower whereby tangentially flowing air passes into said central bore.

5. The wind turbine of claim 4 wherein said means for providing radially flowing air to said central bore includes a space between said inner and outer walls, said space being in communication with said plurality of smaller openings of said wind chamber, and a porous portion of said inner wall whereby air passes upwardly from said wind chamber through said smaller openings of said wind chamber into said space between said inner and outer walls and through said porous portion of said inner wall into said central bore of said tower.

6. The wind turbine of claim 5 wherein said vortex flow exits said wind collecting tower through said open upper end and creates a corresponding low pressure zone along said longitudinal axis of said tower so as to draw ambient air from said wind chamber through said first opening of said wind chamber so as to drive said turbine.

7. The wind turbine of claim 1 wherein said wind collecting tower is circular in cross section.

8. The wind turbine of claim 1 wherein said wind collecting tower is spiral in cross section.

9. The wind turbine of claim 1 wherein said means for providing radially flowing air to said central bore is a vertically disposed slot in said tower and a porous portion in said inner wall whereby air passes directly into said space between said inner and outer walls and through said porous portion of said inner wall into said central bore of said tower.

* * * * *